May 22, 1956
E. C. WRIGHT
2,746,857
METHOD OF MAKING FERRO-MANGANESE HAVING OVER 60%
MANGANESE FROM WASTE STEEL MILL SLAGS AND
LOW GRADE NATURAL ORES
Filed Dec. 24, 1952
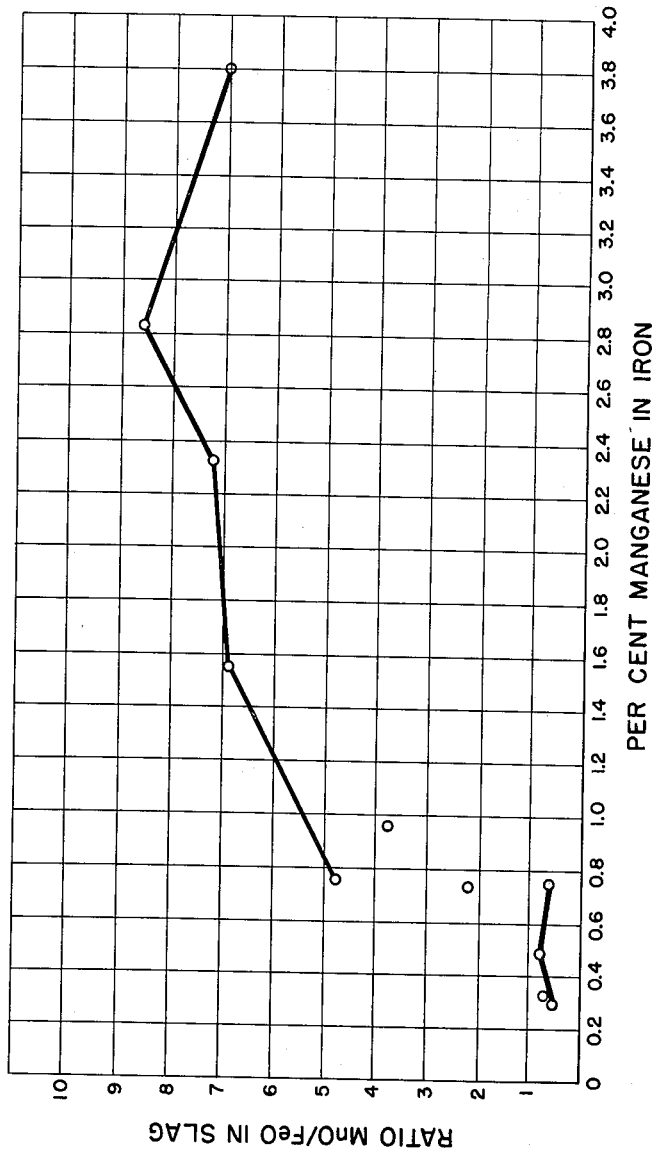
INVENTOR.
Edwin C. Wright
BY
HIS ATTORNEYS

United States Patent Office 2,746,857
Patented May 22, 1956

2,746,857

METHOD OF MAKING FERRO-MANGANESE HAVING OVER 60% MANGANESE FROM WASTE STEEL MILL SLAGS AND LOW GRADE NATURAL ORES

Edwin C. Wright, University, Ala.

Application December 24, 1952, Serial No. 327,748

5 Claims. (Cl. 75—24)

This invention relates to the recovery of manganese from waste steel mill slags and low grade natural ores containing from 2% to 20% manganese and to the production from such materials of a ferro-manganese alloy having a relatively high manganese content.

In the United States, there is practically no manganese ore suitable for making high manganese alloys and over 90% of the manganese consumed here in making steel is imported.

It is known in producing steel from pig iron that carbon, silicon, manganese, phosphorus and certain other elements must be oxidized and reduced to a low level. After reaching this stage, the slag which contains the undesired elements is removed and the composition of the steel is adjusted by the addition thereto of desired elements. It is also known that the various elements to be removed from the pig iron by oxidation do not oxidize simultaneously but successively or in stages. Thus, when molten pig iron is subjected to the action of oxidizing agents such as oxygen, air, iron ore, or the like, silicon first takes the oxygen, manganese next, then carbon and lastly phosphorus. These elements which form solid oxides rise to the surface of the bath and form a slag. Since there is always a preponderance of iron present (over 90% of the pig iron) during the oxidation of the bath, a considerable amount of iron is oxidized in all stages as a mass action effect even though only a small amount of iron should be oxidized under equilibrium conditions until the silicon, manganese and carbon have been oxidized. As a result, slags now produced in steel-making operations are contaminated with iron oxide, and generally have a MnO to FeO ratio seldom reaching 2 and usually below 1.

In the manufacture of steel by the Bessemer, open hearth or electric furnace process approximately 90% of the manganese in the charge is lost in the refining slags. These slags are considered waste materials and are disposed of on slag dumps. The composition of typical waste slags from various steel-making processes are shown in Table I:

As a result of this situation, the steel industry loses as much manganese in its steel-making processes as it has to supply in the finishing of steel. The role of manganese in steel-making is very crucial, since it regulates and controls the detrimental element sulphur.

Throughout the history of the steel industry, most of these and similar slags have been discarded as waste even though their total manganese content per ton of steel made, is equal to or greater than the amount of manganese required in producing a ton of steel. The utility and value of a process adapted to recover the manganese from these waste slags therefore should be obvious when it is realized that about 600,000 tons of manganese are required annually to produce about 80 million tons of steel.

The desirability of recovering manganese from these waste slags and from lean manganese ores has long been recognized and while much work has been done on the problem by the United States Bureau of Mines and others, no satisfactory process has heretofore been developed or even described, so far as I know.

One object of this invention is to provide a process or method whereby manganese may be efficiently and economically recovered from these waste slags and lean manganese ores by use of existing steel mill facilities without detrimentally affecting the quality of the steel being produced in such mills.

Another object is to provide a method or process whereby a ferro-manganese alloy can be produced from these waste slags which has a relatively high (over 60%) manganese content, a manganese to iron ratio of at least 4 to 1 and which has less than .20% phosphorus, by use of existing steel mill facilities without detrimentally affecting the quality of the steel being produced by such mills.

A further object is to provide a process or method by the practice of which a ferro-manganese alloy can be produced from these waste slags and lean manganese ores, containing from 78–82% manganese, 6–7% carbon, 1.5% maximum silicon and less than .3% phosphorus.

These and other objects that will be apparent to those skilled in the steel-making art, I attain by the method or process described in the specification forming part of this application.

Broadly, the method of this invention in producing a ferro-manganese alloy rich in manganese and having a Mn to Fe ratio of at least 4 to 1 from such waste slags or low grade natural ores comprises the following three steps: (1) Preparing a blast furnace charge containing a quantity of these waste steel mill slags or such low grade natural ores or a mixture of such slags and natural ores together with the other constituents of a normal blast furnace charge; smelting such charge in a blast furnace to re-

TABLE I

*Analyses and quantity of steel mill slags*

| | Mixer Slag | Bessemer Slags | | Openhearth Slags | | | | |
|---|---|---|---|---|---|---|---|---|
| | | 4 Min.[a] | Ladle [b] | Runoff [c] | Runoff [b] | Runoff [d] | Final | Ladle [e] |
| MnO | 34.10 | 23.90 | 24.10 | 15.10 | 20.80 | 16.67 | 7.17 | 44.20 |
| (Mn) | 26.40 | 18.51 | 18.68 | 11.71 | 16.10 | 13.68 | 5.65 | 34.30 |
| FeO | 10.70 | 20.24 | 20.50 | 44.59 | 27.00 | 42.20 | 15.02 | 24.60 |
| (Fe) | 8.32 | 15.70 | 15.90 | 34.70 | 21.00 | 32.80 | 11.68 | 19.30 |
| SiO$_2$ | 54.50 | 53.44 | 50.30 | 21.28 | 24.30 | 20.14 | 17.05 | 12.0 |
| CaO | 0.40 | 0.50 | 2.45 | 11.71 | 14.20 | 9.50 | 46.85 | 12.20 |
| MgO | | | | 3.11 | 5.70 | 3.30 | 8.00 | 1.20 |
| P$_2$O$_5$ | | | | 1.32 | 3.3 | 2.25 | 1.51 | |
| Al$_2$O$_3$ | 0.20 | | | 2.20 | 3.00 | 2.57 | | 5.10 |
| Lb. Slag [f] | 50 | 130 | 165 | 160 | 144 | 150 | 150 | 28 |
| Lb. Mn [f] | 13.2 | 21.4 | 25.8 | 18.7 | 23.2 | 20.5 | 8.5 | 9.5 |

[a] Based on pig iron with 1.08% Si and 0.80% Mn.
[b] Quoted from Bray, "Ferrous Production Metallurgy."
[c] Based on hot metal with 0.50% Mn; average of several heats.
[d] Quoted from "Basic Openhearth Steelmaking," A. I. M. E.
[e] Deoxidation slag from rimmed steel heat (45% Mn recovery).
[f] Pounds per ton of steel.

cover in the resultant molten pig iron substantially all of the manganese content of such lean manganese materials; (2) transferring such molten pig iron to an acid lined vessel and introducing a gaseous oxygen-containing agent such as air into such vessel and in contact with the molten pig iron therein to form an oxidic slag which is rich in manganese (MnO) and silica ($SiO_2$), removing this rich manganese silica-containing slag from such molten pig iron prior to reducing the manganese content of the molten pig iron below 0.8%; (3) then charging into a carbon or graphite lined smelting furnace a mixture comprising such rich manganese-containing slag together with sufficient carbon to reduce the iron and manganese content thereof and lime (CaO) in the proportion of two parts of lime to one part of silica ($SiO_2$) in such slag and then heating such mixture to a temperature of between 1600° C. and 1700° C. In this step, most of the iron (FeO) and manganese (MnO) in the rich manganese containing slag are reduced to a ferro-manganese alloy and most of the silica is held in the slag as a di-calcium silicate.

Most pig iron now used for making steel contains from about 1.0% to about 2.5% of manganese. In practicing the process of this invention, I preferably make molten pig iron containing about 5% of manganese by adding to a blast furnace burden or charge sufficient waste manganese-containing slag or low grade manganese ore or both to bring the manganese content of the molten pig iron to about 5%. Such molten pig iron can be produced in a normal American blast furnace without any substantial change in blast furnace operation or any increase in the cost. While these waste steel mill slags and low grade manganese ores can be satisfactorily employed in the production of molten pig iron containing a higher percentage of manganese, I prefer a molten pig iron containing about 5% since such a pig iron is suitable for carrying out the remaining steps of the process or method of this invention in making a ferro-manganese alloy having a relatively high manganese content and imposes no extra burden on the blast furnace.

The following is an example of a typical blast furnace charge sheet using ores and slags occurring in the United States which will produce a molten pig iron containing about 5% of manganese:

METAL COMPOSITION

| | |
|---|---|
| Fe in pig iron | percent 89.0 |
| Theo. pig iron | pounds 2,240 |
| Percent of good product | 91 |
| Actual pig iron expected | pounds 2,000 |
| Percent phosphorus | .57 |
| Percent manganese | 5.00 |

SLAG COMPOSITION

| | Lb. | Percent |
|---|---|---|
| Less $SiO_2$ for 1.5% Si in Pig | 73.0 | |
| Remaining: | | |
| $SiO_2$ | 565.7 | 36.00 |
| $Al_2O_3$ | 140.9 | 9.00 |
| CaO | 762.7 | 49.00 |
| MgO | 78.7 | 5.00 |
| Total | 1,528.0 | 2.00 |
| | | 99.00 |
| Add 2% | 30 | |
| Total Slag | 1,558 | |

Ratio of Lime and Mag. to $SiO_2$—1.49.

While it is possible and might be advantageous purely from a manganese recovery standpoint to produce molten pig iron having a manganese content of as much or more than 10%, as pointed out above, I prefer a molten pig iron having a manganese content of about 5% since the making of pig iron having a greater percentage of manganese would entail extra expense in the blast furnace operation.

The critical importance of maintaining the manganese content of the molten pig iron at 0.8% or above is shown in the graph constituting the sole figure in this application. It is seen from this graph that when the manganese content of the molten pig iron, regardless of the initial content, is reduced by oxidation, to an amount below 0.8%, the resulting slag has a very low MnO to FeO ratio, usually below 1. However, when the oxidation is stopped and the slag removed while the manganese content of the molten metal is about 0.8% or above, the MnO to FeO ratio of the slag exceeds 4.

The Table III below sets forth the data upon which the graph is based.

TABLE III

| Heat No. | Composition of Iron before Oxidation | | | Composition of Iron After Oxidation | | | Composition of Slag After Oxidation | | | MnO/FeO Ratio in Slag |
|---|---|---|---|---|---|---|---|---|---|---|
| | Percent C | Percent Mn | Percent Si | Percent C | Percent Mn | Percent Si | Percent MnO | Percent FeO | Percent $SiO_2$ | |
| 1A | ¹4.4 | ¹0.98 | ¹1.0 | 4.17 | 0.75 | 0.66 | 20.67 | 34.63 | 42.48 | 0.60 |
| 2A | 4.17 | 0.75 | 0.66 | 4.06 | 0.52 | 0.47 | 23.85 | 30.61 | 44.28 | 0.78 |
| 3A | 4.06 | 0.52 | 0.47 | 3.98 | 0.32 | 0.32 | 19.97 | 38.37 | 39.72 | 0.52 |
| 4A | 3.98 | 0.32 | 0.32 | 4.63 | 0.35 | 0.25 | 21.91 | 31.63 | 46.60 | 0.69 |
| 5B | ¹4.4 | ¹4.0 | ¹1.0 | 4.00 | 3.79 | 0.87 | 51.95 | 7.47 | 40.24 | 6.95 |
| 6B | 4.00 | 3.79 | 0.87 | 3.96 | 2.84 | 0.61 | 52.89 | 6.18 | 41.00 | 8.56 |
| 7B | 3.96 | 2.84 | 0.61 | 3.91 | 2.34 | 0.42 | 52.65 | 7.33 | 40.64 | 7.18 |
| 8B | 3.91 | 2.34 | 0.42 | 3.83 | 1.55 | 0.28 | 52.20 | 7.62 | 39.92 | 6.85 |
| 9B | 3.83 | 1.55 | 0.28 | 3.77 | 0.77 | 0.09 | 49.76 | 10.63 | 39.12 | 4.68 |
| 10 | 3.94 | 3.40 | 1.39 | 3.33 | 0.95 | 0.20 | 45.03 | 12.36 | 40.98 | 3.64 |
| 11 | 4.17 | 2.43 | 1.34 | 3.43 | 0.74 | 0.24 | 37.43 | 17.54 | 43.26 | 2.13 |

¹ Nominal analysis of charge.

From the table it will be noted that in those instances wherein the MnO to FeO ratio of the slag exceeds about

TABLE II

*Blast furnace charge for 5% Mn pig iron*

| Mixture | | Fe | | P | | Mn | | $SiO^2$ | | $Al_2O_3$ | | CaO | | MgO | |
|---|---|---|---|---|---|---|---|---|---|---|---|---|---|---|---|
| Material | Pounds | Percent | Lb. | Percent | Lb. | Percent | Lb. | Percent | Lb. | Percent | Lb. | Percent | Lb. | Percent | Lb. |
| Mesabi ore | 2,500 | 56.5 | 1,410 | 0.075 | 1.9 | 0.75 | 19.0 | 9.60 | 240.00 | 1.00 | 25.0 | | | | |
| Cuyuna ore | 1,000 | 47.8 | 478.0 | 0.25 | 2.5 | 4.62 | 46.2 | 12.26 | 122.6 | 3.00 | 30.0 | 0.50 | 5.0 | 1.50 | 15.0 |
| Openhearth slag | 600 | 13.00 | 78.0 | 0.80 | 4.8 | 8.00 | 48.0 | 16.00 | 96.0 | 2.00 | 12.0 | 47.00 | 282.0 | 8.00 | 48.0 |
| Stone | 850 | 0.50 | 4.2 | 0.03 | 0.26 | | | 3.00 | 25.5 | 1.00 | 8.5 | 53.00 | 450.5 | 1.00 | 8.5 |
| Flush slag | 180 | 21.00 | 37.8 | 1.00 | 1.8 | 16.10 | 29.0 | 22.00 | 39.6 | 3.00 | 5.4 | 14.00 | 25.2 | 4.00 | 7.2 |
| Coke | 2,000 | 0.70 | 14.0 | 0.02 | 0.40 | | | 5.75 | 115.0 | 3.00 | 60.0 | | | | |
| Totals | | | 2,023.0 | | 11.66 | | 142.2 | | 638.7 | | 140.9 | | 762.7 | | 78.7 |

4 there is also a high oxidic manganese content in the slag of the order of 50% or higher whereas when the ratio of MnO to FeO is low the oxidic manganese content of the slag also is low.

The data in the table were obtained from carefully controlled tests wherein a quantity of pig iron of the indicated manganese content was melted in a high frequency furnace, cleaned of kish, and thereafter oxidized by introducing gaseous oxygen below the metal surface through a silica tube. Progressive results were noted as the oxidation proceeded. Thus, heat numbers ending in the letter A represent one series, heat numbers ending in B a second series and heat numbers 10 and 11 independent determinations.

The molten pig iron so prepared and containing about 5% of manganese is preferably transferred from the blast furnace to an acid lined Bessemer converter in which it is blown for from about 2 to about 5 minutes; the blowing being stopped before the manganese content of the molten iron drops below 0.8%. This oxidation step may be performed in a hot metal transfer ladle, a hot metal mixer or an acid open hearth furnace, however, since the vessel should be acid lined, I prefer to carry on such oxidation step in a bottom blown acid lined Bessemer converter.

The critically important features of this blowing or oxidation step are to conduct the blowing in an acid lined vessel and to limit the air or oxygen introduced into the molten pig iron to an amount that will leave at least 0.8% manganese in the molten pig iron after the blowing is stopped.

At the end of this oxidation step, the carbon content of the molten pig iron will exceed 3%, and very little iron will have been oxidized. If the step is performed in an acid lined vessel, such as an acid lined Bessemer converter, the slag will contain no phosphorus and will be composed primarily of manganese silicate. This high manganese slag is then skimmed or otherwise separated from the molten iron and employed in the third step of this method by which this slag is converted into a ferro-manganese alloy having a relatively high manganese content and a Mn to Fe ratio of at least 4 to 1.

In carrying out this third step or stage of my method I utilize a smelting furnace having a carbon or graphite lining and preferably provided with a bottom tap hole. I charge such furnace with a dry mixture of this high manganese converter slag plus lime (CaO) in the proportion of two parts thereof to one part of $SiO_2$ in the slag together with sufficient carbon (approximately 25% as much carbon as lime) to reduce the iron and manganese. After such mixture is blended, I charge the same into the smelting furnace and then raise the temperature of the mixture to between 1600° C. and 1700° C. When the temperature reaches about 1650° C., most of the iron and manganese are reduced to a ferro-manganese alloy having less than 1.5% silicon, since most of the silica ($SiO_2$) is held in the slag as a di-calcium silicate.

I have found that the addition of about 5% fluorspar ($CaF_2$) and about 10% of magnesia (MgO) to this mixture is very effective in increasing the fluidity of the high calcium slag at the smelting temperature.

I have found that carbon (including graphite) is the only refractory which can be used, since it withstands the very high temperatures which are necessary for the thorough reduction of manganese from this slag and since the smelting of these slags causes a rapid erosion of any of the common refractories such as silica, magnesia, fire clay, etc. The graphite lining also supplies some carbon for reducing MnO to Mn.

I have found that the surplus of lime in the mixture holds practically all of the silica in the final slag in the form of a di-calcium silicate, whereas most of the iron oxide and MnO of the slag are reduced to form a manganese rich ferro-manganese alloy which separates from the slag and may be cast into useful shapes.

A peculiar result of this smelting operation is that the di-calcium silicate slag which has a ratio of over two parts of lime to one part of silica, completely disintegrates upon solidification to a very fine impalpable powder, most of which will pass through a 200 mesh screen. In most of the smelting operations conducted in connection with the testing of the method of this invention, it was found that about 10% of the Mn was not recovered. This Mn remains trapped in the slag as a black constituent which may be readily separated from the very fine di-calcium silicate slag by a simple screening operation. This black slag always contains over 50% manganese and after recovery by screening, may be charged back into the smelting furnace in subsequent heats. The black slag is mostly a mixture of manganese carbide and carbon which has a specific gravity similar to the main volume of di-calcium silicate slag.

Table IV shows the results of two typical smelting charges wherein standard ferro-manganese alloys are obtained from the high manganese slags resulting from the second step of this process:

TABLE IV

| Heat No. | Wt. used | MnO Slag Reduced Analysis | | | Weight of Various Fluxes (gram) and reducing agent | | | | | Ratio, CaO SiO₂ | Analysis Metal, percent | | | Analysis of Final Slag | | | Max Temp., °C. | Yield Metal, percent |
|---|---|---|---|---|---|---|---|---|---|---|---|---|---|---|---|---|---|---|
| | | $SiO_2$ | FeO | MnO | CaO | MgO | $CaF_2$ | $Al_2O_3$ | Carbon | | Si | Fe | Mn | $SiO_2$ | FeO | MnO | | |
| 20 | 200 | 40.0 | 7.92 | 51.9 | 180 | 27.0 | 13.5 | 0 | 20.0 | 2.0 | ------ | 10.2 | 80.2 | 28.6 | 0.82 | 2.6 | 1,700 | 75.0 |
| 22 | 940 | 35.3 | 4.83 | 55.8 | 618 | 69.0 | 48.0 | 0 | 154.0 | 2.0 | .94 | 9.9 | 77.5 | 29.6 | 0.26 | 6.1 | 1,700 | 73.5 |

Remarks: Reduced with gas whole slag turned to white powder, 18 percent black slag—82 percent grey slag (applies to both heats).

According to the method of this invention, a ton of 5% manganese containing molten pig iron after being oxidized sufficiently to lower the manganese content thereof to about 0.8% will yield about 0.1085 ton of slag containing over 38% manganese (50% MnO). With such a slag, 90% of the contained manganese can be recovered by the third step or stage of this method. Thus it will be seen that about 75.6 pounds of manganese can be recovered from the slag of each ton of 5% manganese containing pig iron treated in accordance with the method of this invention.

In the customary method of steel-making about one-half a ton of pig iron is used to make one ton of steel and an average of about 14 pounds of manganese is required for each ton of steel produced. It is thus apparent that by incorporating into the pig iron the manganese from the waste slags and lean manganese ores and treating the pig iron so produced in accordance with the method of this invention, more than sufficient manganese can be recovered to supply the total manganese requirement of normal steel production without resorting to outside sources.

The molten pig iron from which the rich manganese slag has been separated during the second step of this method or process, and which contains at least 0.8% manganese may be profitably employed in the production of steel, either by the acid Bessemer, the basic open hearth or the electric furnace method. This metal should be highly desirable for steel-making, as the quantity of slag that will be produced will be less than in standard practices and the operating time will be shorter due to the elimination of most of the silicon which has entered the slag as silica, $SiO_2$. The temperature of this molten iron is very high, generally above 3000° F.

Since this molten partially blown metal is so low in silicon, it will require but a small lime addition in the open hearth to make a proper slag. Moreover, as the temperature of 3000° F. is approximately 500° higher than the temperature of the hot metal now supplied to open hearth furnaces, the melting time in the open hearth will be greatly accelerated. The combined factors of low silicon and high temperature will make possible an increase in open hearth production of at least 25% on typical steel-making charges of 50% hot metal and 50% cold scrap. The ore addition for oxidizing the silicon in this low silicon pig iron will be greatly reduced over that now considered necessary. As a result of these several factors, the open hearth slag volume will be reduced to from 30 to about 50% of what is now normal.

This application is a continuation-in-part of my co-pending application Serial No. 158,647, filed April 28, 1950, now abandoned.

What I claim is:

1. A method of employing lean manganese-containing material such as steel mill slags and low grade ores containing from 2 to 20% manganese in the production of a ferro-manganese alloy containing at least about 60% manganese, not over 7.0% carbon, not over 1.5% silicon, and not over 0.30% phosphorus, which consists in supplementing a normal blast furnace charge with a sufficient quantity of such lean manganese material as to produce a pig iron containing in the neighborhood of 5% manganese; smelting such a charge in a blast furnace to the extent of producing pig iron containing substantially all the manganese included in the charge; blowing such pig iron while maintained at about 1650° C. and while contained in an acid lined vessel, with a blast containing gaseous oxygen to produce a slag on said bath rich in manganese oxide and silica, with a manganese to iron ratio of at least 4 to 1 and with less than 0.05% phosphorus; removing the slag so formed from the molten bath prior to reducing the manganese content of the bath below 0.8%; charging the slag so removed into a carbon-lined smelting furnace together with sufficient carbon to reduce the iron and manganese oxide content of such slag, and lime in the proportion of about two parts lime to one part silica in such slag; smelting the mixture at a temperature within the range of from about 1600° C. to 1700° C., increasing fluidity of the slag by the addition of fluorspar ($CaF_2$), and maintaining the mixture at such a smelting temperature until substantially all the manganese oxide content therein is reduced to manganese.

2. A method as defined in claim 1 in which smelting of the slag is accomplished in a carbon lined smelting furnace.

3. A method as defined in claim 1 in which the lean manganese-containing material is only steel mill slag.

4. A method as defined in claim 1 in which the lean manganese-containing material is only low grade ore containing manganese within the range of from about 2% to about 20%.

5. A method as defined in claim 1 wherein the carbon is provided for the last-mentioned smelting operation in an amount of about 25% as much carbon as lime.

References Cited in the file of this patent

UNITED STATES PATENTS

| 712,925 | Gin | Nov. 4, 1902 |
| 1,846,152 | Sheldon | Feb. 23, 1932 |
| 1,979,753 | Lose et al. | Nov. 6, 1934 |
| 2,701,194 | Deterding | Feb. 1, 1955 |

FOREIGN PATENTS

| 3,808 | Great Britain | of 1885 |

OTHER REFERENCES

Chemical Abstracts, vol. 33, 1939 column 4570. The reaction of high carbon iron-manganese melts with iron oxides, iron sulfide and silicates at 1300–1400°.

"A Comprehensive Treatise on Inorganic and Theoretical Chemistry" by Mellor, vol. 12, page 164.